(12) United States Patent
Wei et al.

(10) Patent No.: US 11,606,041 B2
(45) Date of Patent: Mar. 14, 2023

(54) SYNCHRONOUS RECTIFIER CONTINUOUS CONDUCTION MODE DETECTION APPARATUS AND CONTROL METHOD

(71) Applicant: Halo Microelectronics International, Campbell, CA (US)

(72) Inventors: Kai-Fang Wei, San Jose, CA (US); Zhibo Tao, San Jose, CA (US); Yueguo Hao, Shanghai (CN)

(73) Assignee: Halo Microelectronics International, Campbell, CA (US)

( * ) Notice: Subject to any disclaimer, the term of this patent is extended or adjusted under 35 U.S.C. 154(b) by 161 days.

(21) Appl. No.: 17/356,916

(22) Filed: Jun. 24, 2021

(65) Prior Publication Data
US 2022/0416675 A1 Dec. 29, 2022

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC .............................. H02M 3/33592; H02M 1/08
See application file for complete search history.

(56) References Cited

U.S. PATENT DOCUMENTS

| 8,400,790 | B2 | 3/2013 | Zhang et al. | |
| 2009/0244932 | A1* | 10/2009 | Lin | H02M 3/33592 363/21.06 |
| 2012/0020123 | A1* | 1/2012 | Hsu | H02M 3/33592 363/21.14 |
| 2022/0302850 | A1* | 9/2022 | Wu | H02M 1/0032 |

* cited by examiner

*Primary Examiner* — Kyle J Moody
(74) *Attorney, Agent, or Firm* — Slater Matsil, LLP

(57) ABSTRACT

A synchronous rectifier control apparatus includes a continuous conduction mode detection circuit configured to receive a voltage across a synchronous rectifier switch and determine whether the synchronous rectifier switch operates in a continuous conduction mode based on a rising slope of the voltage across the synchronous rectifier switch, a turn-off timer control circuit configured to measure a conduction time of the synchronous rectifier switch and turn off the synchronous rectifier switch after the conduction time of the synchronous rectifier switch in a current cycle is substantially equal to the conduction time measured in an immediately previous cycle, and a drive voltage control circuit configured to reduce a gate drive voltage of the synchronous rectifier switch after the conduction time of the synchronous rectifier switch in the current cycle is substantially equal to the conduction time measured in the immediately previous cycle multiplied by a predetermined percentage.

20 Claims, 10 Drawing Sheets

SYNCHRONOUS RECTIFIER CONTINUOUS CONDUCTION MODE DETECTION APPARATUS AND CONTROL METHOD

TECHNICAL FIELD

The present invention relates to a synchronous rectifier continuous conduction mode detection apparatus and control method, and, in particular embodiments, to a synchronous rectifier continuous conduction mode detection apparatus and control method in a flyback power converter.

BACKGROUND

As technologies further advance, a variety of portable devices, such as mobile phones, tablet PCs, digital cameras, MP3 players and/or the like, have become popular. A portable device receives power from a power source. The power source may be an adapter converting power from an alternating current (ac) power supply to a regulated direct current (dc) voltage.

The adapter may include an electromagnetic interference filter (EMI) filter, a rectifier and an isolated dc/dc converter connected in cascade between the ac power supply and the portable device. The EMI filter of the adapter is used to suppress conducted EMI noise from the ac power supply. The rectifier is connected directly to the output terminals of the EMI filter. The rectifier is able to convert the input ac waveform to a pulsating dc waveform at the output terminals of the rectifier. A plurality of capacitors may be coupled between the two output terminals of the rectifier. The capacitors are used to attenuate the ripple of the pulsating dc waveform.

The adaptor is configured to provide power for charging a rechargeable battery of the portable device. Due to high efficiency, small dimensions and light weight, the flyback converter is widely used in the adaptor. In the adaptor, the flyback converter functions as an isolated converter to provide isolation through a transformer.

The conventional flyback converter comprises a primary switch, a transformer, a diode and a plurality of output capacitors. The primary winding of the transformer is connected in series with the primary switch. The secondary winding of the transformer is connected in series with the diode. The transformer provides energy transferring between the input and the output with a voltage ratio. In addition, the transformer provides isolation between the primary side and the secondary side of the transformer. Furthermore, the transformer of the flyback converter functions as a pair of coupled inductors for storing energy. When the primary switch is turned on, energy is stored in the windings of the transformer. The polarity dots of the transformer and the diode are arranged such that there is no energy transferred to the secondary side when the primary switch is on. The load current is maintained by the plurality of output capacitors. On the other hand, when the primary switch is turned off, the polarity of the transformer reverses. The diode conducts and the energy stored in the transformer is transferred to the load as well as the output capacitors.

As the power electronics industry further advances, the diode of the conventional flyback converter may be replaced by a switch (e.g., a field effect transistor) to further reduce conduction losses. This technique is referred to as synchronous rectification. The switch may be referred to as a synchronous rectifier switch. The flyback converter may further comprise a primary controller and a secondary controller. The primary side controller is employed to control the operation of the primary side switch. The secondary side controller is employed to control the operation of the synchronous rectifier switch.

In operation, when the primary switch is turned on, the drain-to-source voltage of the synchronous rectifier switch is greater than zero. The secondary side controller keeps the synchronous rectifier switch off. After the primary switch has been turned off, and the energy stored in the transformer is transferred to the load, the current first flows through the body diode of the synchronous rectifier switch. The conduction of the body diode brings the drain-to-source voltage of the synchronous rectifier switch below zero. Upon detecting this voltage change, the secondary side controller turns on the synchronous rectifier switch. Then, the secondary side controller determines whenever to turn-off the synchronous rectifier switch by sensing the drain-to-source voltage of the synchronous rectifier switch. In a discontinuous conduction mode (DCM) operation of the flyback converter, the current flowing through the secondary side drops to zero. The secondary side controller turns off the synchronous rectifier switch after finding that the drain-to-source voltage of the synchronous rectifier switch crosses zero volts. In a continuous conduction mode (CCM) operation of the flyback converter, the primary side controller turns on the primary switch before the secondary side current is fully discharged. The turn-on of the primary switch causes a transient at the secondary side since both the primary switch and the synchronous rectifier switch are turned on. The transient causes a large inrush current. Such a large inrush current brings the drain-to-source voltage of the synchronous rectifier switch to a level greater than zero. In response to this drain-to-source voltage, the secondary side controller turns off the synchronous rectifier switch.

The transient in the CCM operation of the flyback converter leads into a big current stress on the synchronous rectifier switch. The current stress degrades the reliability of the synchronous rectifier switch. It would be desirable to have a simple control scheme for reducing the large inrush current, thereby improving the reliability of the flyback converter. The present disclosure addresses this need.

SUMMARY

These and other problems are generally solved or circumvented, and technical advantages are generally achieved, by preferred embodiments of the present disclosure which provide a synchronous rectifier continuous conduction mode detection apparatus and control method in a flyback power converter.

In accordance with an embodiment, a synchronous rectifier control apparatus comprising a continuous conduction mode detection circuit configured to receive a voltage across a synchronous rectifier switch and determine whether the synchronous rectifier switch operates in a continuous conduction mode based on a rising slope of the voltage across the synchronous rectifier switch, a turn-off timer control circuit configured to measure a conduction time of the synchronous rectifier switch and turn off the synchronous rectifier switch after the conduction time of the synchronous rectifier switch in a current cycle is substantially equal to the conduction time measured in an immediately previous cycle, and a drive voltage control circuit configured to reduce a gate drive voltage of the synchronous rectifier switch after the conduction time of the synchronous rectifier switch in the current cycle is substantially equal to the conduction time measured in the immediately previous cycle multiplied by a predetermined percentage.

In accordance with another embodiment, a method comprises detecting a voltage across a synchronous rectifier switch, determining whether the synchronous rectifier switch operates in a continuous conduction mode based on a rising slope of the voltage across the synchronous rectifier switch, and after finding that the synchronous rectifier switch operates in the continuous conduction mode, measuring a conduction time of the synchronous rectifier switch in a current cycle, and turning off the synchronous rectifier switch after the conduction time of the synchronous rectifier switch in the current cycle is substantially equal to the conduction time measured in an immediately previous cycle.

In accordance with yet another embodiment, a system comprises a secondary winding magnetically coupled to a primary winding, a synchronous rectifier switch having a first drain/source terminal connected to the secondary winding and a second drain/source terminal connected to a common voltage node, a controller configured to generate a gate drive signal applied to a gate of the synchronous rectifier switch, wherein the controller comprises a continuous conduction mode detection circuit configured to receive a voltage across the synchronous rectifier switch and determine whether the synchronous rectifier switch operates in a continuous conduction mode based on a rising slope of the voltage across the synchronous rectifier switch, and a turn-off timer control circuit configured to measure a conduction time of the synchronous rectifier switch in a current cycle, and turn off the synchronous rectifier switch after the conduction time of the synchronous rectifier switch in the current cycle is substantially equal to the conduction time measured in an immediately previous cycle.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a synchronous rectifier continuous conduction mode detection apparatus and control method in a flyback power converter. The invention may also be applied, however, to a variety of power converters. Hereinafter, various embodiments will be explained in detail with reference to the accompanying drawings.

Figure 1:
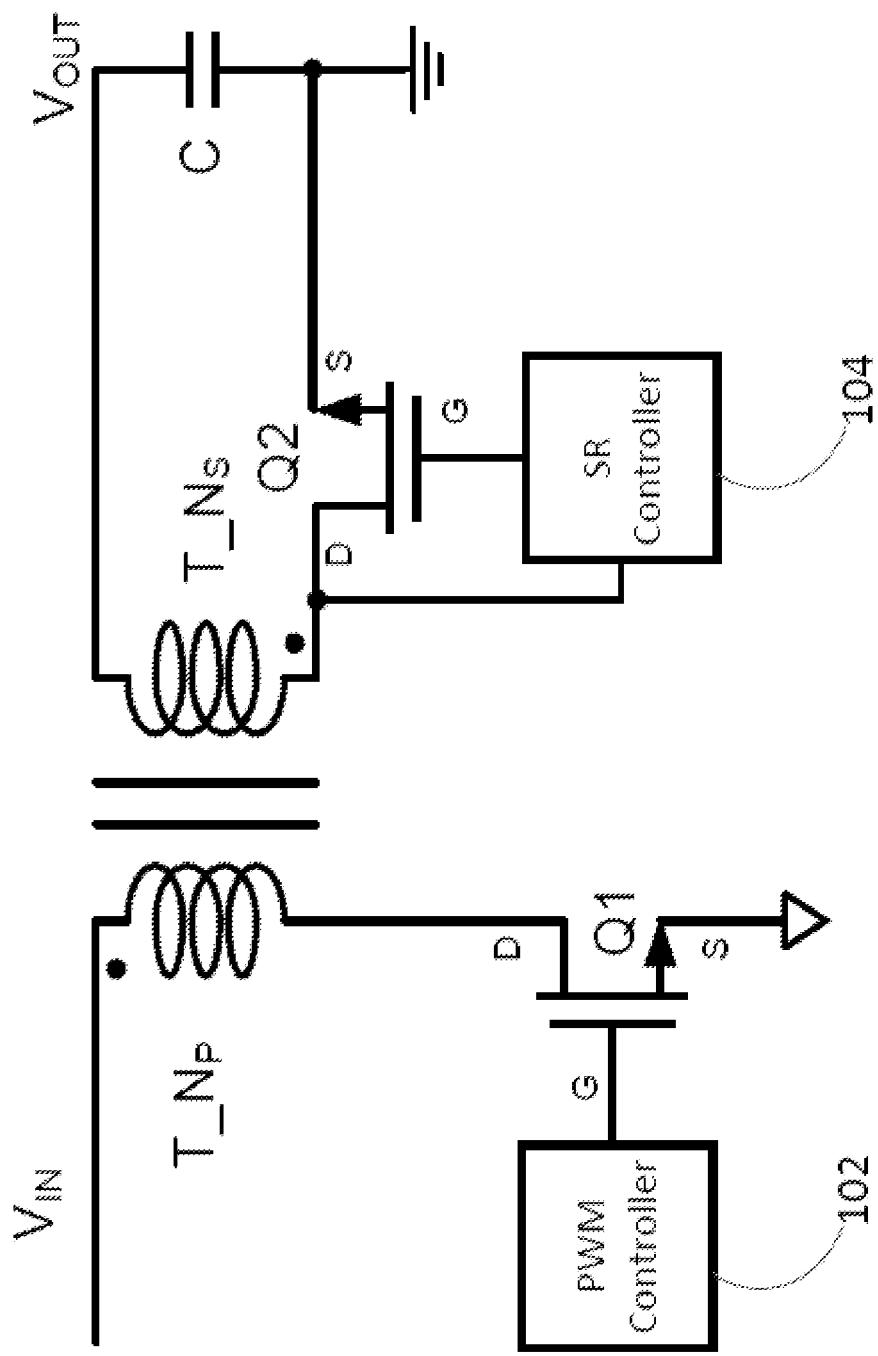
FIG. 1 illustrates a schematic diagram of a flyback converter in accordance with various embodiments of the present disclosure.

FIG. 1 illustrates a schematic diagram of a flyback converter in accordance with various embodiments of the present disclosure. The flyback converter shown in FIG. 1 comprises a primary switch Q1, a transformer including a primary winding $T\_N_P$ and a secondary winding $T\_N_S$, a synchronous rectifier switch Q2 and an output capacitor C. A load (not shown) may be connected in parallel with the output capacitor C.

The flyback converter further comprises a primary controller 102 and a secondary controller 1104. As shown in FIG. 1, the polarity dots on the transformer are placed in reversed positions. In other words, the primary voltage and the secondary voltage are 180 degrees out of phase from each other. The polarity dots and the control scheme of the synchronous rectifier switch Q2 are arranged such that there is no energy transferred from the transformer to the load when the primary switch Q1 is turned on.

As shown in FIG. 1, the primary winding $T\_N_P$ of the transformer and the primary switch Q1 are connected in series between an input voltage bus $\backslash T_{IN}$ and ground. The secondary winding $T\_N_S$ of the transformer is magnetically coupled to the primary winding T_N$_P$. The synchronous rectifier switch Q2 is connected between the secondary winding T_N$_S$ and ground. As shown in FIG. 1, a drain of the synchronous rectifier switch Q2 is connected to the secondary winding T_N$_S$, and a source of the synchronous rectifier switch Q2 is connected ground.

In accordance with an embodiment, the switches (e.g., Q1 and Q2) of FIG. 1 may be metal—oxide—semiconductor field-effect transistor (MOSFET) devices. Alternatively, the switches can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 1 shows the switches (e.g., Q1) are implemented as single n-type transistors, a person skilled in the art would recognize there may be many variations, modifications and alternatives. For example, depending on different applications and design needs, all or at least some of the switches may be implemented as p-type transistors. Furthermore, each switch shown in FIG. 1 may be implemented as a plurality of switches connected in parallel. Moreover, a capacitor may be connected in parallel with one switch to achieve zero voltage switching (ZVS)/zero current switching (ZCS).

The primary controller 102 is configured to generate a pulse-width modulation (PWM) signal. This PWM signal is used to control the turn-on and turn-off of the primary switch Q1 to achieve the regulation of the output voltage VOuT. The primary controller 102 may be alternatively referred to as a PWM controller as shown in FIG. 1.

The secondary controller 104 is configured to control the turn-on and turn-off of the synchronous rectifier switch Q2 to achieve synchronous rectification. The secondary controller 104 may be alternatively referred to as a synchronous rectifier (SR) controller 104 as shown in FIG. 1.

In operation, when the primary switch Q1 is turned on, the synchronous rectifier switch Q2 is turned off. The primary winding T_N$_P$ is directly coupled between \T$_{IN}$ and ground. As the current flowing through the primary winding T_N$_P$ increases, energy is stored in the transformer. At the same time, the output capacitor C supplies power to the load based on previously stored energy. On the other hand, when the primary switch Q1 is turned off, the synchronous rectifier switch Q2 is turned on. The energy stored in the transformer is transferred to the load. The current flowing through the secondary side of the transformer provides power to the load as well as the output capacitor C.

In operation, depending on different loading conditions, the flyback converter may operate either in a continuous conduction mode (CCM) or in a discontinuous conduction mode (DCM). The synchronous rectifier controller 104 is able to find whether the flyback converter operates in the CCM based on the drain-to-source voltage of the synchronous rectifier switch Q2. Furthermore, the synchronous rectifier controller 104 is able to determine the time instant for turning off the synchronous rectifier switch Q2 so as to prevent a large inrush current from being excessively applied to the secondary side of the flyback converter.

In some embodiments, the synchronous rectifier controller 104 comprises a continuous conduction mode detection circuit, a turn-off timer control circuit and a drive voltage control circuit. These three circuits are employed to find whether the flyback converter operates in the CCM and determine the time instant for turning off the synchronous rectifier switch Q2. The detailed structure and operating principle of the synchronous rectifier controller 104 will be described below with respect to FIG. 2.

The continuous conduction mode detection circuit is configured to receive a voltage across the synchronous rectifier switch Q2, and determine whether the synchronous rectifier switch Q2 operates in a continuous conduction mode based on a rising slope of the voltage across the synchronous rectifier switch Q2. The detailed structure and operating principle of the continuous conduction mode detection circuit will be described below with respect to FIGS. 3-4.

The turn-off timer control circuit is configured to measure a conduction time of the synchronous rectifier switch Q2, and turn off the synchronous rectifier switch Q2 after the conduction time of the synchronous rectifier switch Q2 in a current cycle is substantially equal to the conduction time measured in an immediately previous cycle. The detailed structure and operating principle of the turn-off timer control circuit will be described below with respect to FIGS. 5-6.

The drive voltage control circuit is configured to reduce a gate drive voltage of the synchronous rectifier switch Q2 after the conduction time of the synchronous rectifier switch in the current cycle is substantially equal to the conduction time measured in an immediately previous cycle multiplied by a predetermined percentage. The detailed structure and operating principle of the drive voltage control circuit will be described below with respect to FIGS. 7-8.

Figure 2:
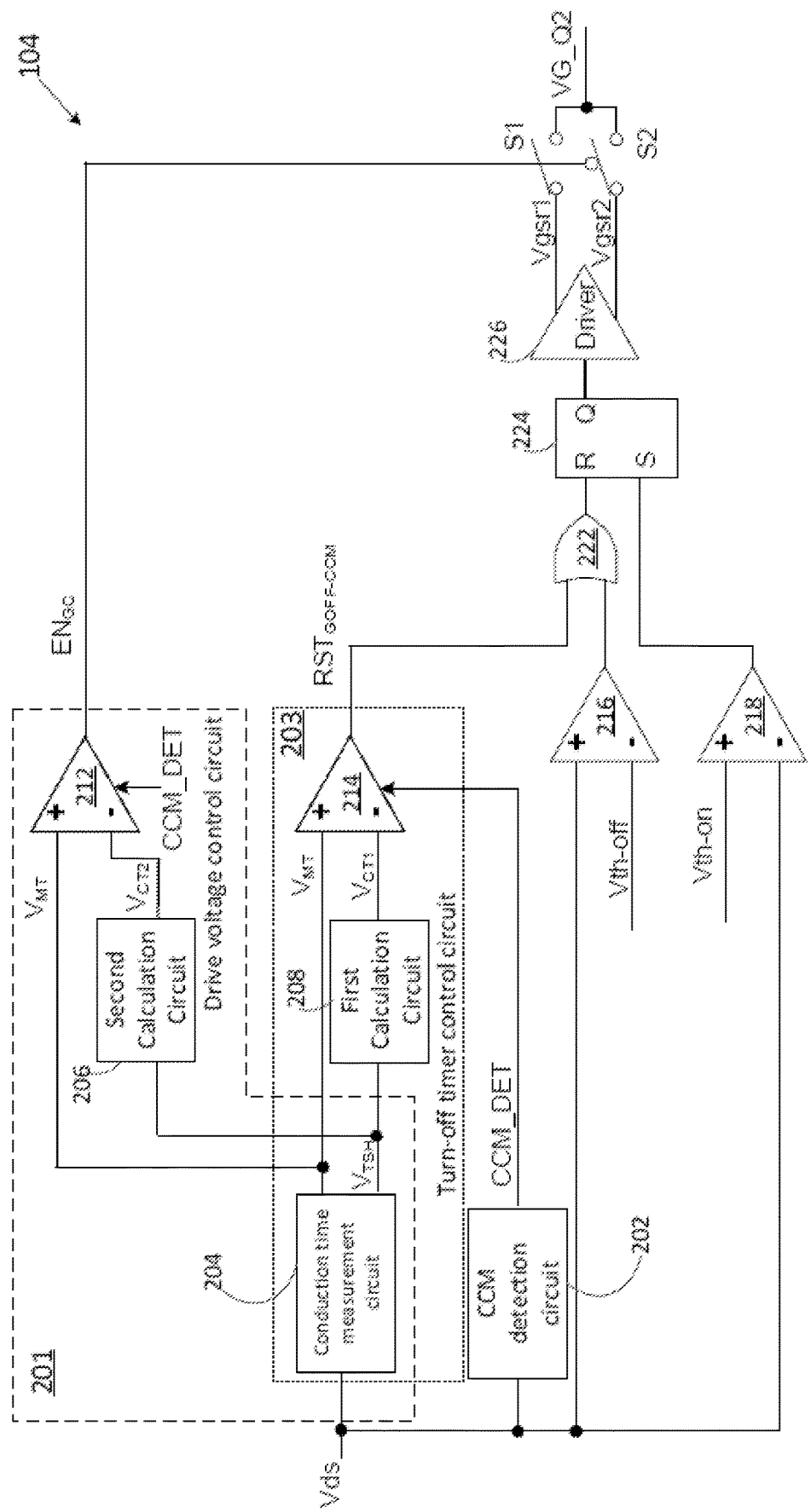
FIG. 2 illustrates a schematic diagram of the synchronous rectifier controller shown in FIG. 1 in accordance with various embodiments of the present disclosure.

FIG. 2 illustrates a schematic diagram of the synchronous rectifier controller shown in FIG. 1 in accordance with various embodiments of the present disclosure. The synchronous rectifier controller 104 comprises a continuous conduction mode (CCM) detection circuit 202, a turn-off timer control circuit 203 and a drive voltage control circuit 201. As shown in FIG. 2, a conduction time measurement circuit 204 is shared by the turn-off timer control circuit 203 and the drive voltage control circuit 201. The turn-off timer control circuit 203 further comprises a first calculation circuit 208 and a comparator 214. The drive voltage control circuit 201 further comprises a second calculation circuit 206 and a comparator 212. As shown in FIG. 2, the synchronous rectifier controller 104 further comprises comparators 216, 218, an OR gate 222, a latch 224, a driver 226, a first switch S1 and a second switch S2.

The continuous conduction mode detection circuit 202 is configured to receive the voltage (Vds) across the synchronous rectifier switch Q2, and determine whether the synchronous rectifier switch Q2 operates in the continuous conduction mode based on a rising slope of the voltage across the synchronous rectifier switch Q2. Once the CCM operation has been detected, the output (CCM_DET) of the continuous conduction mode detection circuit 202 is configured to generate a logic high state (CCM_DET="1"). This logic high state is used to enable the turn-off timer control circuit 203 and the drive voltage control circuit 201 as shown in FIG. 2.

The turn-off timer control circuit 203 is configured to measure a conduction time of the synchronous rectifier switch Q2 in a current cycle, and turn off the synchronous rectifier switch Q2 after the conduction time of the synchronous rectifier switch in the current cycle is substantially equal to the conduction time measured in an immediately previous cycle. As shown in FIG. 2, the conduction time measurement circuit 204 is employed to measure the conduction time of the synchronous rectifier switch Q2, and convert the conduction time into a voltage signal V$_{MT}$. The conduction time measurement circuit 204 further comprises a sample-and-hold circuit (not shown but illustrated in FIG. 5) configured to process the voltage signal $V_{MT}$ to generate a signal $V_{TSH}$ for use in the next cycle (in the next cycle, $V_{TSH}$ represents the conduction time in the immediately previous cycle).

As shown in FIG. 2, $V_{MT}$ is fed into a non-inverting input of the comparator 214. $V_{TSH}$ is fed into the first calculation circuit 208. The first calculation circuit 208 is a first gain stage having a first predetermined scale factor. The output $V_{CT1}$ of the first calculation circuit 208 is fed into an inverting input of the comparator 214. $V_{MT}$ represents the conduction time in the current cycle. $V_{CT1}$ represents the conduction time in the immediately previous cycle. Once the conduction time in the current cycle exceeds the conduction time in the immediately previous cycle, the output $RST_{GOFF-CCM}$ of the comparator 214 generates a logic high state ($RST_{GOFF-CCM}$="1"). As shown in FIG. 2, this logic high state is applied to the reset input of the latch 224. In response to this logic high state applied to the reset input of the latch 224, the output VG_Q2 of the synchronous rectifier controller 104 generates a signal to turn off Q2.

The driver 226 is capable of generating two gate drive voltages, namely Vgsr1 and Vgsr2. In some embodiments, Vgsr1 is greater than Vgsr2. By turning on S1 and turning off S2, the output signal of the synchronous rectifier controller 104 is of a voltage level equal to Vgsr1. On the other hand, by turning off S1 and turning on S2, the output signal of the synchronous rectifier controller 104 is of a voltage level equal to Vgsr2.

The drive voltage control circuit 201 is configured to reduce a gate drive voltage of the synchronous rectifier switch Q2 after the conduction time of the synchronous rectifier switch in the current cycle is substantially equal to the conduction time measured in an immediately previous cycle multiplied by a predetermined percentage. As shown in FIG. 2, $V_{MT}$ is fed into a non-inverting input of the comparator 212. $V_{TSH}$ is fed into the second calculation circuit 206. The second calculation circuit 206 is a second gain stage having a second predetermined scale factor. The output $V_{CT2}$ of the second calculation circuit 206 is fed into an inverting input of the comparator 212. $V_{MT}$ represents the conduction time in the current cycle. $V_{CT2}$ represents a fraction of the conduction time in the immediately previous cycle (the conduction time measured in the immediately previous cycle multiplied by a predetermined percentage). The faction is determined by the second predetermined scale factor. Once the conduction time in the current cycle exceeds the fraction of the conduction time in the immediately previous cycle, the output $EN_{GC}$ of the comparator 212 generates a logic high state ($EN_{GC}$="1"). As shown in FIG. 2, this logic high state is applied to the switch S2. In response to this logic high state, the switch S2 is turned on and the switch S1 is turned off. The output VG_Q2 of the synchronous rectifier controller 104 changes the drive voltage from Vgsr1 to Vgsr2.

As shown in FIG. 2, a non-inverting input of the comparator 216 is configured to receive Vds. An inverting input of the comparator 216 is configured to receive a turn-off threshold voltage Vth-off. Once Vds exceeds Vth-off, the output of the comparator 216 generates a logic high state. As shown in FIG. 2, this logic high state is applied to the reset input of the latch 224. In response to this logic high state, the output VG_Q2 of the synchronous rectifier controller 104 generates a signal to turn off Q2.

As shown in FIG. 2, a non-inverting input of the comparator 218 is configured to receive Vds. An inverting input of the comparator 218 is configured to receive a turn-on threshold voltage Vth-on. Once Vds drops below Vth-on, the output of the comparator 218 generates a logic high state. As shown in FIG. 2, this logic high state is applied to the set input of the latch 224. In response to this logic high state, the output VG_Q2 of the synchronous rectifier controller 104 generates a signal to turn on Q2.

Figure 3:
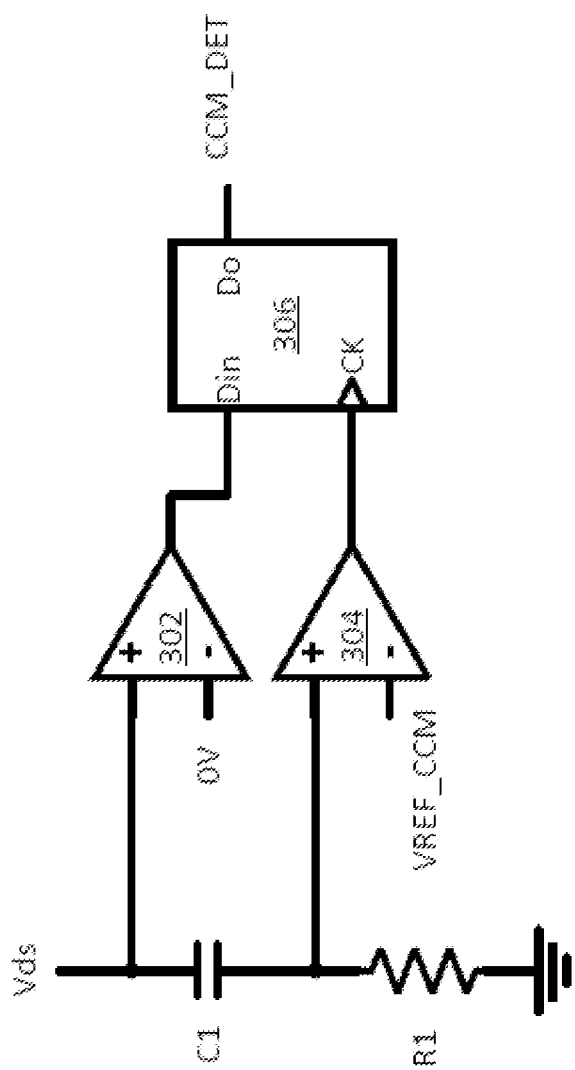
FIG. 3 illustrates a schematic diagram of the continuous conduction mode detection circuit in accordance with various embodiments of the present disclosure.

FIG. 3 illustrates a schematic diagram of the continuous conduction mode detection circuit in accordance with various embodiments of the present disclosure. The continuous conduction mode detection circuit 204 comprises a capacitor C1, a resistor R1, a first comparator 302, a second comparator 304 and a latch circuit 306. As shown in FIG. 3, the capacitor C1 and the resistor R1 are connected in series between Vds (a drain/source terminal of the synchronous rectifier switch Q2) and ground. A non-inverting input of the first comparator 302 is connected to Vds. An inverting input of the first comparator 302 is connected to ground. An output of the first comparator 302 is connected to an input terminal (Din) of the latch circuit 306. A non-inverting input of the second comparator 304 is connected to a common node of the capacitor C1 and the resistor R1. An inverting input of the second comparator 304 is connected to a predetermined continuous conduction mode reference voltage VREF_CCM. An output of the second comparator 304 is connected to a clock input terminal (CK) of the latch circuit 306. An output terminal of the latch circuit 306 is configured to generate the signal CCM_DET to enable the turn-off timer control circuit 203 and the drive voltage control circuit 201 after finding that the flyback converter operates in the CCM.

Figure 4:
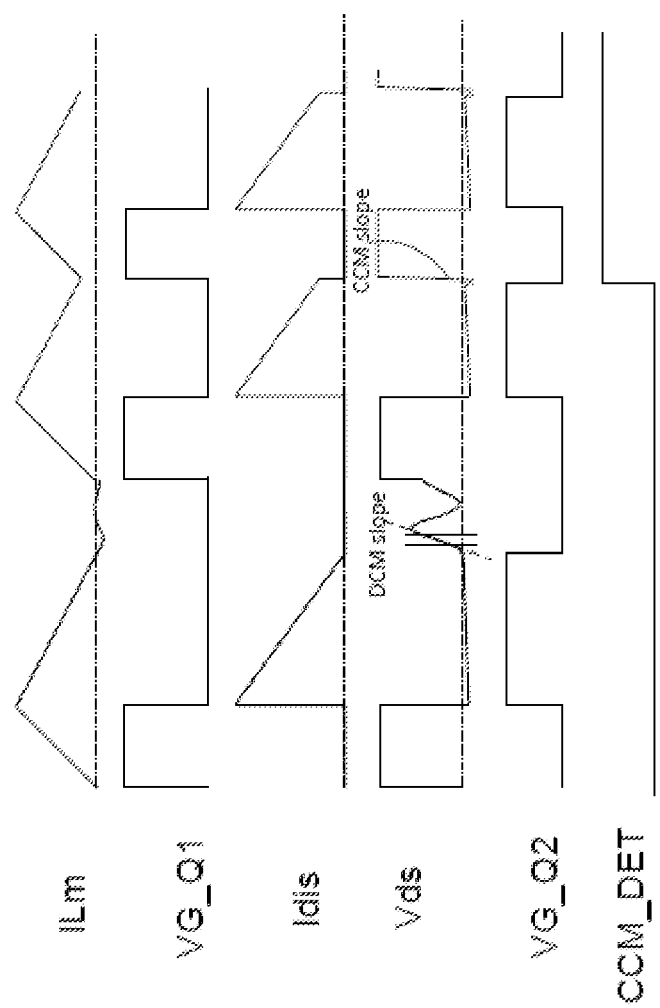
FIG. 4 is a timing diagram illustrating the operating principle of the continuous conduction mode detection circuit shown in FIG. 3 in accordance with various embodiments of the present disclosure.

In operation, when the flyback converter operates in the CCM, Vds has a steep rising slope (not shown but illustrated in FIG. 4). On the other hand, when the flyback converter operates in the DCM, Vds has a shallow rising slope (not shown but illustrated in FIG. 4). In the CCM, when Vds changes from zero to a high voltage with a steep rising slope, the voltage across R1 is approximately equal to the high voltage because the voltage across C1 cannot change instantaneously. This high voltage (voltage across R1) is greater than VREF_CCM. The output of the second comparator 304 generates a logic high state applied to the clock input terminal (CK) of the latch circuit 306. In addition, the first comparator 302 also generates a logic high state. In response to these two logic high states, the latch circuit 306 generates a logic high state (CCM_DET="1").

In the DCM, when Vds changes from zero to a high voltage with a shallow rising slope, the voltage across R1 cannot reach VREF_CCM because the voltage across C1 can be established during this shallow rising slope. The output of the second comparator 304 generates a logic low state applied to the clock input terminal (CK) of the latch circuit 306. In response to this logic low state, the latch circuit 306 remains the original logic state (CCM_DET="0").

FIG. 4 is a timing diagram illustrating the operating principle of the continuous conduction mode detection circuit shown in FIG. 3 in accordance with various embodiments of the present disclosure. The horizontal axis of FIG. 4 represents intervals of time. There are six vertical axes. The first vertical axis represents the magnetizing current (ILm) of the transformer. The second vertical axis represents the gate drive signal (VG_Q1) of the primary switch Q1. The third vertical axis represents the discharge current (Idis) flowing in the secondary side. The fourth vertical axis represents the drain-to-source voltage (Vds) of the synchronous rectifier switch Q2. The fifth vertical axis represents the gate drive signal (VG_Q2) of the synchronous rectifier switch Q2. The sixth vertical axis represents the output signal (CCM_DET) of the continuous conduction mode detection circuit 202.

The continuous conduction mode detection circuit 202 (shown in FIG. 3) is configured to detect the rising slope of the voltage across the synchronous rectifier switch Q2 on a cycle-by-cycle basis, and generate a signal to enable the turn-off timer control circuit 203 and the drive voltage control circuit 201 upon detecting the continuous conduction mode. Referring back to FIG. 3, the voltage across a synchronous rectifier switch Q2 is applied to a capacitor-resistor network comprising a capacitor C1 and a resistor R1 connected in series. The voltage on a common node of the resistor R1 and the capacitor C1 is compared with the predetermined continuous conduction mode reference VREF_CCM to determine whether the synchronous rectifier switch Q2 operates in the continuous conduction mode.

As shown in FIG. 4, in the DCM, Vds changes from zero to a high voltage with a shallow rising slope. As discussed above with respect to FIG. 3, the continuous conduction mode detection circuit remains the original logic state (CCM_DET="0") as shown in FIG. 4. In the CCM, Vds changes from zero to a high voltage with a steep rising slope. As discussed above with respect to FIG. 3, the continuous conduction mode detection circuit generates a logic high state (CCM_DET="1") as shown in FIG. 4.

Figure 5:
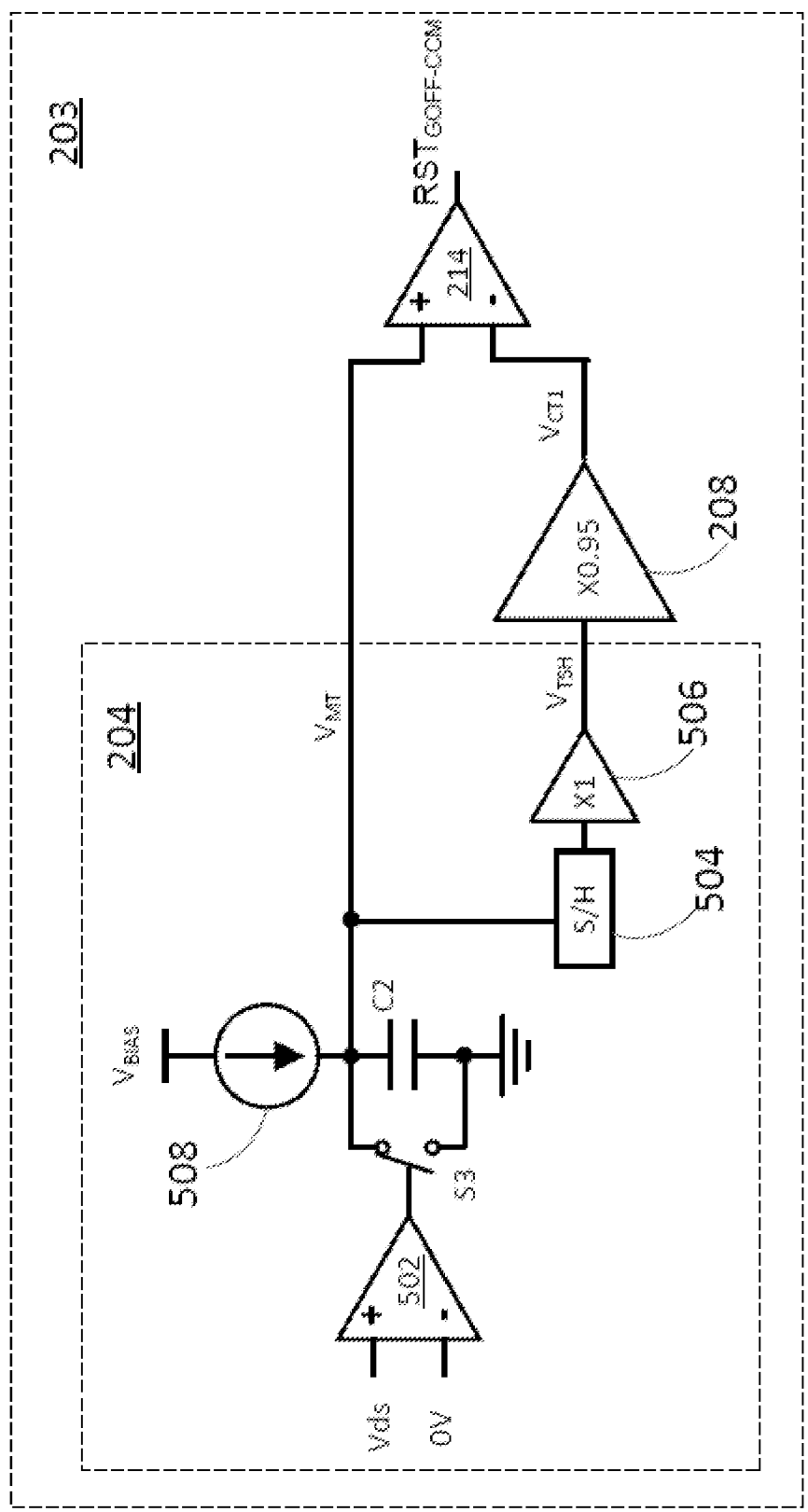
FIG. 5 illustrates a schematic diagram of the turn-off timer control circuit shown in FIG. 2 in accordance with various embodiments of the present disclosure.

FIG. 5 illustrates a schematic diagram of the synchronous rectifier turn-off timer control circuit shown in FIG. 2 in accordance with various embodiments of the present disclosure. The turn-off timer control circuit 203 comprises the conduction time measurement circuit 204, the first calculation circuit 208 and the comparator 214. As shown in FIG. 5, the conduction time measurement circuit 204 comprises a comparator 502, a switch S3, a capacitor C2, a current source 508, a sample-and-hold circuit 504 and a buffer stage 506.

As shown in FIG. 5, a non-inverting input of the comparator 502 is connected to Vds (a drain/source terminal of the synchronous rectifier switch Q2). An inverting input of the comparator 502 is connected to ground. An output of the comparator 502 is connected to a gate of the switch S3. The current source 508 and the capacitor C2 are connected in series between a bias voltage VBIAS and ground. The capacitor C2 and the switch S3 are connected in parallel. The sample-and-hold circuit 504 is connected to a common node of the current source 508 and the capacitor C2. The output of the sample-and-hold circuit 504 is fed into the buffer stage 506. The output of the buffer stage 506 is configured to generate $V_{TSH}$.

A first output ($V_{MT}$) of the conduction time measurement circuit 204 is connected to a non-inverting input of the comparator 214. A second output ($V_{TSH}$) of the conduction time measurement circuit 204 is connected to an inverting input of the comparator 214 through the first calculation circuit 208. The first calculation circuit 208 is a first gain stage having a first predetermined scale factor. In some embodiments, the first predetermined scale factor is equal to 0.95 as shown in FIG. 5. An output signal $RST_{GOFF\text{-}CCM}$ of the comparator 214 is configured to turn off the synchronous rectifier switch Q2 after the conduction time of the synchronous rectifier switch in a current cycle is substantially equal to the conduction time measured in the immediately previous cycle.

In operation, the conduction time measurement circuit 204 is configured to convert the conduction time of the synchronous rectifier switch Q2 in the current cycle into a first voltage signal (e.g., $V_{MT}$). The sample-and-hold circuit 504 is applied to the first voltage signal to generate a conduction time signal for use in the next cycle.

As shown in FIG. 5, once the synchronous rectifier switch Q2 starts to conduct, Vds is less than zero volts. The output of the comparator 502 generates a logic low signal, which turns off the switch S3. After the switch S3 has been turned off, the current source 508 charges the capacitor C2 in a linear manner. The voltage ($V_{MT}$) across the capacitor C2 represents the conduction time of the synchronous rectifier switch Q2. The sample-and-hold circuit 504 samples the voltage $V_{MT}$ and holds its value for use in the next cycle. The output of the sample-and-hold circuit 504 is fed into the buffer stage 506. In some embodiments, the gain of the buffer stage 506 is equal to 1. The output of the buffer stage 506 is $V_{TSH}$. In operation, the voltage $V_{MT}$ represents the conduction time of a current cycle. $V_{TSH}$ represents the conduction time of an immediately previous cycle.

In some embodiments, the gain of the first calculation circuit 208 may be equal to 1. The synchronous rectifier switch Q2 is turned off after the conduction time of the synchronous rectifier switch Q2 in the current cycle is substantially equal to the conduction time measured in an immediately previous cycle. Alternatively, in order to prevent a turn-off delay due to measurement errors, a margin (e.g., 5%) is added into the turn-off timer control circuit 203 through the first calculation circuit 208. As shown in FIG. 5, after adding the margin of 5%, the gain of the first calculation circuit 208 is 0.95. It is appreciated that the gain (0.95) illustrated in FIG. 5 is merely an example. Depending on different applications and design needs, the gain of the first calculation circuit 208 may be changed to different values. Furthermore, the first calculation circuit 208 may provide a fixed reduction of $V_{TSH}$ to get $V_{CT1}$. For example, $V_{CT1}$ is equal to $V_{TSH}$ subtracted by a predetermined duration of time. Moreover, the first calculation circuit 208 may provide an adjustable percentage. For example, $V_{CT1}$ is equal to $V_{TSH}$ multiplied by a dynamic percentage (the percentage provided by 206 varies on a cycle-by-cycle basis). Such a dynamic percentage provides more flexibility in control design. In some embodiments, the dynamic percentage may help to improve the EMI performance of the flyback converter.

Figure 6:
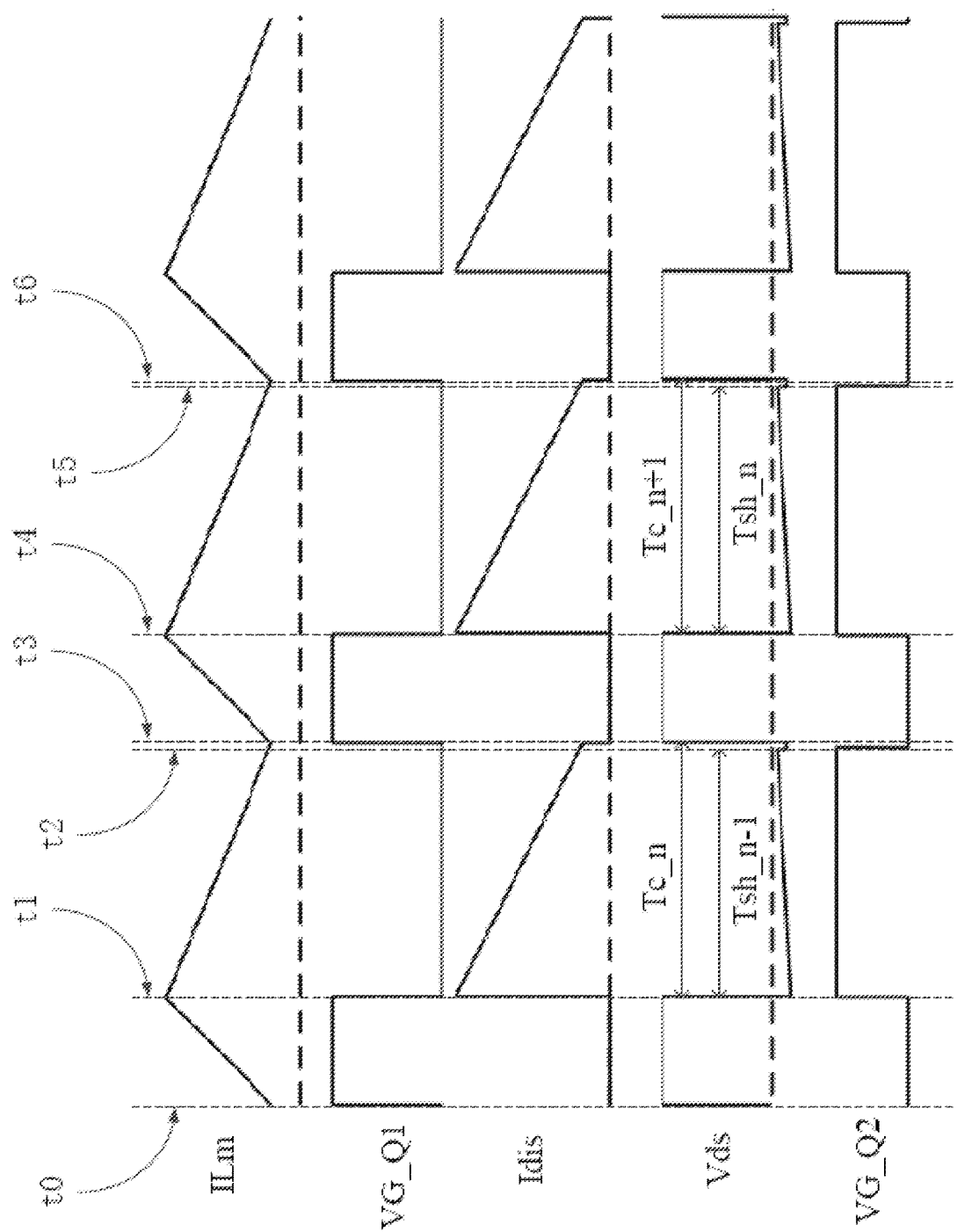
FIG. 6 is a timing diagram illustrating the operating principle of the synchronous rectifier turn-off timer control circuit shown in FIG. 5 in accordance with various embodiments of the present disclosure.

FIG. 6 is a timing diagram illustrating the operating principle of the turn-off timer control circuit shown in FIG. 5 in accordance with various embodiments of the present disclosure. The horizontal axis of FIG. 6 represents intervals of time. There are five vertical axes. The first vertical axis represents the magnetizing current (ILm) of the transformer. The second vertical axis represents the gate drive signal (VG_Q1) of the primary switch Q1. The third vertical axis represents the discharge current (Idis) flowing in the secondary side. The fourth vertical axis represents the drain-to-source voltage (Vds) of the synchronous rectifier switch Q2. The fifth vertical axis represents the gate drive signal (VG_Q2) of the synchronous rectifier switch Q2.

At t0, the primary switch Q1 is turned on. The current ILm increases in a linear manner from t0 to t1, and energy starts to store in the primary magnetizing inductor of the transformer.

At t1, the primary switch Q1 is turned off. Q2 is turned on from t1 to t2. The current ILm decreases in a linear manner from t1 to t2, and the energy starts to transfer to the secondary side. Idis decreases in a linear manner from t1 to t2. The conduction time measurement circuit 204 starts to measure the conduction time of Q2 and convert the conduction time of Q2 in the current cycle (from t0 to t3) into a voltage signal Tc_n. As shown in FIG. 6, Tc_n represents the time duration from t1 to t3. In a previous cycle, the conduction time of Q2 is converted into a first voltage signal (e.g., Tc_n−1). After a sample-and-hold process, Tc_n−1 is converted into a second voltage signal (e.g., Tsh_n−1) for use in the next cycle.

At t2, once Tc_n is equal to Tsh_n−1, the turn-off timer control circuit 203 is configured to turn off Q2. From t2 to t3, the current Idis flows through the body diode of Q2. At t2, since Q2 leaves the synchronous rectifier mode and enters the diode mode, Vds has a voltage dip caused by the conduction of the body diode of Q2.

At t3, the conduction time of the cycle from t1 to t3 is sampled and held as Tsh_n for use for the next cycle (from t3 to t6). From t3 to t4, the primary switch Q1 is turned on. The current ILm increases in a linear manner from t0 to t1, and energy starts to store in the primary magnetizing inductor of the transformer.

At t4, the primary switch Q1 is turned off. Q2 is turned on from t4 to t5. The current ILm decreases in a linear manner from t4 to t5, and the energy starts to transfer to the secondary side. Idis decreases in a linear manner from t4 to t5. The conduction time measurement circuit starts to measure the conduction time of Q2 and convert the conduction time of Q2 in the current cycle (from t3 to t6) into a voltage signal Tc_n+1.

At t5, once Tc_n+1 is equal to Tsh_n, the turn-off timer control circuit 203 is configured to turn off Q2. From t5 to t6, the current Idis flows through the body diode of Q2. From t5 to t6, Vds has a voltage dip.

At t6, the conduction time of the cycle from t3 to t6 is sampled and held as Tsh_n+1 for use in the next cycle.

Figure 7:
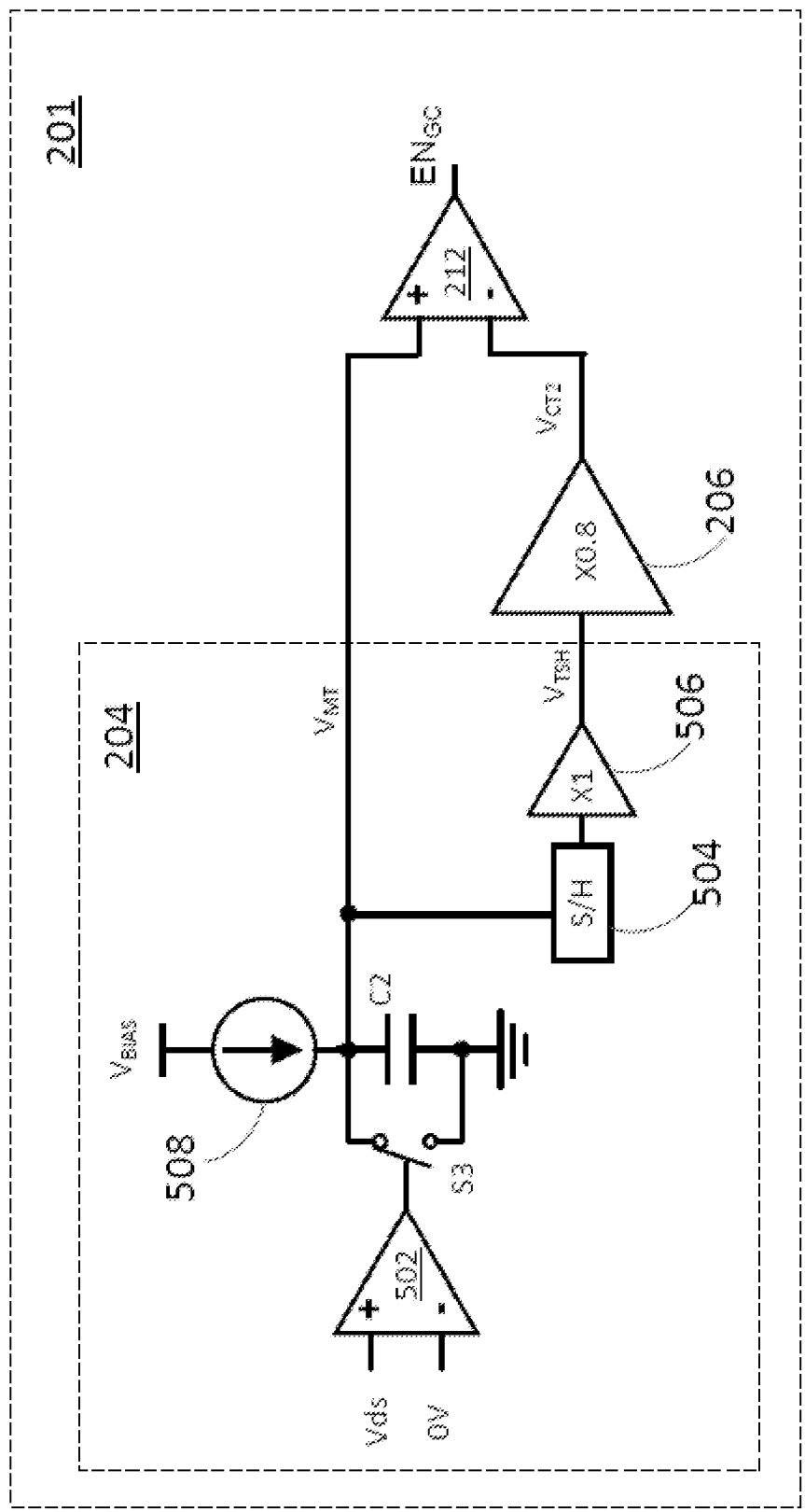
FIG. 7 illustrates a schematic diagram of the drive voltage control circuit shown in FIG. 2 in accordance with various embodiments of the present disclosure.

FIG. 7 illustrates a schematic diagram of the drive voltage control circuit shown in FIG. 2 in accordance with various embodiments of the present disclosure. The drive voltage control circuit 201 is similar to the turn-off timer control circuit 203 shown in FIG. 5 except that the gain of the second calculation circuit 206 is different. In some embodiments, the gain of the second calculation circuit 206 is equal to 0.8 as shown in FIG. 7. In alternative embodiments, the second calculation circuit 206 may provide a fixed reduction of $V_{TSH}$ to get $V_{CT2}$. For example, $V_{CT2}$ is equal to $V_{TSH}$ subtracted by a predetermined duration of time. Moreover, the second calculation circuit 206 may provide an adjustable percentage. For example, $V_{CT2}$ is equal to $V_{TSH}$ multiplied by a dynamic percentage (the percentage provided by 206 varies on a cycle-by-cycle basis). Such a dynamic percentage provides more flexibility in control design. In some embodiments, the dynamic percentage may help to improve the EMI performance of the flyback converter.

It should be noted that the gain (0.8) of the second calculation circuit 206 shown in FIG. 7 is merely an example. Depending on different applications and design needs, the gain of the second calculation circuit 206 may vary accordingly.

It should further be noted that the gain of the second calculation circuit 206 should be less than the gain of the first calculation circuit 208. After having this gain arrangement, the gate drive voltage of Q2 is adjusted from a high gate drive voltage to a low gate drive voltage before Q2 is turned off.

One advantageous feature of having the drive voltage control circuit 201 is reducing the gate drive voltage prior to completely turning off Q2 helps to prevent the system dynamic transient response induced inrush current from causing excessive stresses on Q2.

Figure 8:
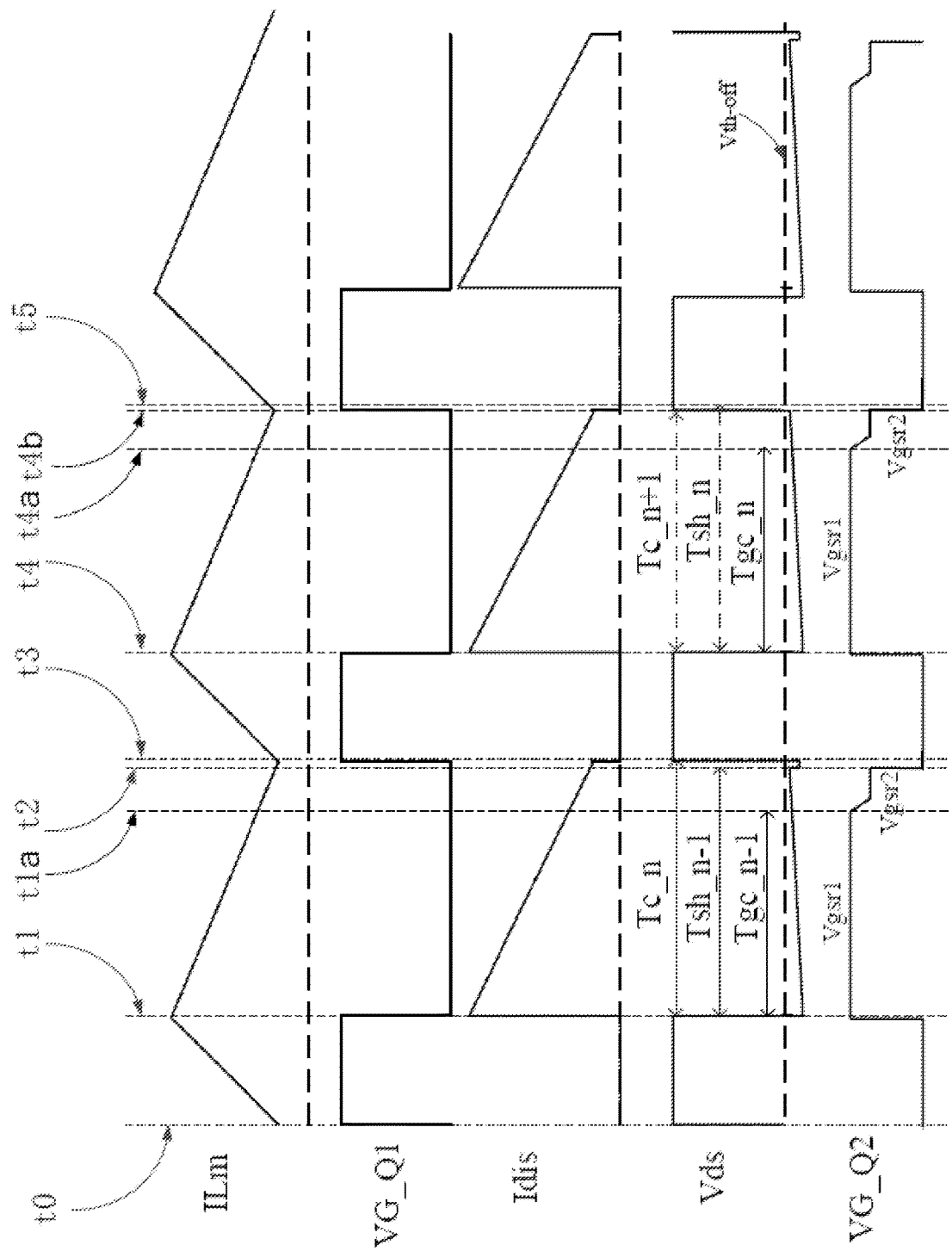
FIG. 8 is a timing diagram illustrating the operating principle of the drive voltage control circuit shown in FIG. 7 in accordance with various embodiments of the present disclosure.

FIG. 8 is a timing diagram illustrating the operating principle of the drive voltage control circuit shown in FIG. 7 in accordance with various embodiments of the present disclosure.

In operation, after finding the synchronous rectifier switch Q2 operates in the continuous conduction mode, the drive voltage control circuit 201 is configured to reduce the gate drive voltage of the synchronous rectifier switch Q2 after the conduction time of the synchronous rectifier switch in the current cycle is equal to the conduction time measured in an immediately previous cycle multiplied by a predetermined percentage.

At t0, the primary switch Q1 is turned on. The current ILm increases in a linear manner from t0 to t1, and energy starts to store in the primary magnetizing inductor of the transformer.

At t1, the primary switch Q1 is turned off. Q2 is turned on from t1 to t2. The current ILm decreases in a linear manner from t1 to t2, and the energy starts to transfer to the secondary side of the transformer. Idis decreases in a linear manner from t1 to t2. The conduction time measurement circuit starts to measure the conduction time of Q2 and convert the conduction time of Q2 in the current cycle (from t0 to t3) into a voltage signal Tc_n. As shown in FIG. 8, Tc_n represents the time duration from t1 to t3. In a previous cycle, the conduction time of Q2 is converted into a first voltage signal (e.g., Tc_n−1). After a sample-and-hold process, Tc_n−1 is converted into a second voltage signal (e.g., Tsh_n−1) for use in the next cycle. Furthermore, Tgc_n−1 is obtained by multiplying the conduction time of Q2 in the previous cycle with a predetermined percentage (e.g., 80%).

At t1a, once Tc_n is equal to Tgc_n−1, the drive voltage control circuit 201 is configured to reduce the gate drive voltage from Vgsr1 to Vgsr2 as shown in FIG. 8.

At t2, once Tc_n is equal to Tsh_n−1, the turn-off timer control circuit 203 is configured to turn off Q2. From t2 to t3, the current Idis flows through the body diode of Q2. At t2, since Q2 leaves the synchronous rectifier mode and enters the diode mode, Vds has a voltage dip caused by the conduction of the body diode of Q2.

At t3, the conduction time of the cycle from t1 to t3 is sampled and held as Tsh_n for use in the next cycle (from t3 to t5). Also at t3, Tgc_n is calculated based on Tc_n by the second calculation circuit 206. From t3 to t4, the primary switch Q1 is turned on. The current ILm increases in a linear manner from t0 to t1, and energy starts to store in the primary magnetizing inductor of the transformer.

At t4, the primary switch Q1 is turned off. Q2 is turned on from t4 to t4b. The current ILm decreases in a linear manner from t4 to t5, and the energy starts to transfer to the secondary side of the transformer. Idis decreases in a linear manner from t4 to t5. The conduction time measurement circuit 204 starts to measure the conduction time of Q2 and convert the conduction time of Q2 in the current cycle (from t3 to t5) into a voltage signal Tc_n+1.

At t4a, once Tc_n+1 is equal to Tgc_n, the drive voltage control circuit 201 is configured to reduce the gate drive voltage of Q2 from Vgsr1 to Vgsr2.

At t4b, due to a dynamic load transient, the primary switch Q1 is turned on at t4b. In response to the turn-on of Q1, Vds is greater than Vth-off (shown in FIG. 2). Q2 is turned off by the comparator 216 shown in FIG. 2. Since the gate drive voltage of Q2 is set at Vgsr2, the induced primary-secondary in-rush current can be well controlled. As a result, the turn off of Q2 can be as fast as possible. At t4b, Tc_n+1 is stored. Tgc_n+1 is calculated based on Tc_n+1 by the second calculation circuit 206.

At t5, since the gate drive signal (VG_Q2) of Q2 is already low, Tsh_n is not responsible for the turn-off of Q2.

Figure 9:
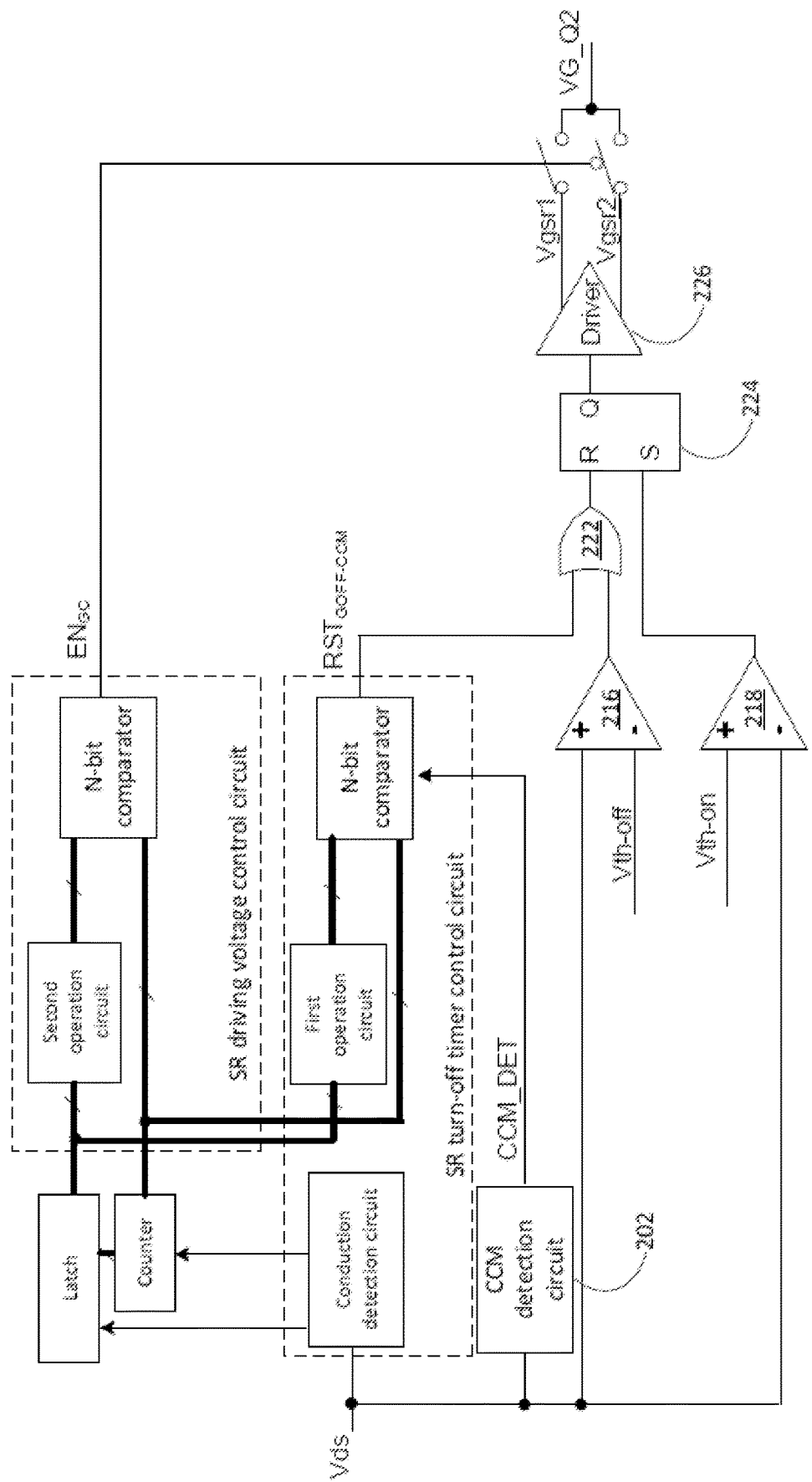
FIG. 9 illustrates a schematic diagram of a digital implementation of the synchronous rectifier controller in accordance with various embodiments of the present disclosure.

FIG. 9 illustrates a schematic diagram of a digital implementation of the synchronous rectifier controller in accordance with various embodiments of the present disclosure. The synchronous rectifier controller shown in FIG. 9 is similar to that shown in FIG. 2 except that some analog circuits have been replaced by the corresponding digital circuits. For example, the comparators 212 and 214 are replaced by N-bit comparators. The conduction time measurement circuit 204 is replaced by a conduction detection circuit, a counter and a latch. The first calculation circuit 208 is replaced by a first operation circuit. The second calculation circuit 206 is replaced by a second operation circuit.

In operation, in a first switching cycle, the counter is used to measure a conduction time of the synchronous rectifier switch Q2. The conduction time of the synchronous rectifier switch Q2 in the first switching cycle is saved into the latch. In a second switching cycle, the counter is used to measure the conduction time of the synchronous rectifier switch Q2 in the second switching cycle. The conduction time in the second switching cycle is compared with the conduction time in the first switching cycle. The comparison result is used to determine a time instant at which the synchronous rectifier switch Q2 is turned off.

Figure 10:
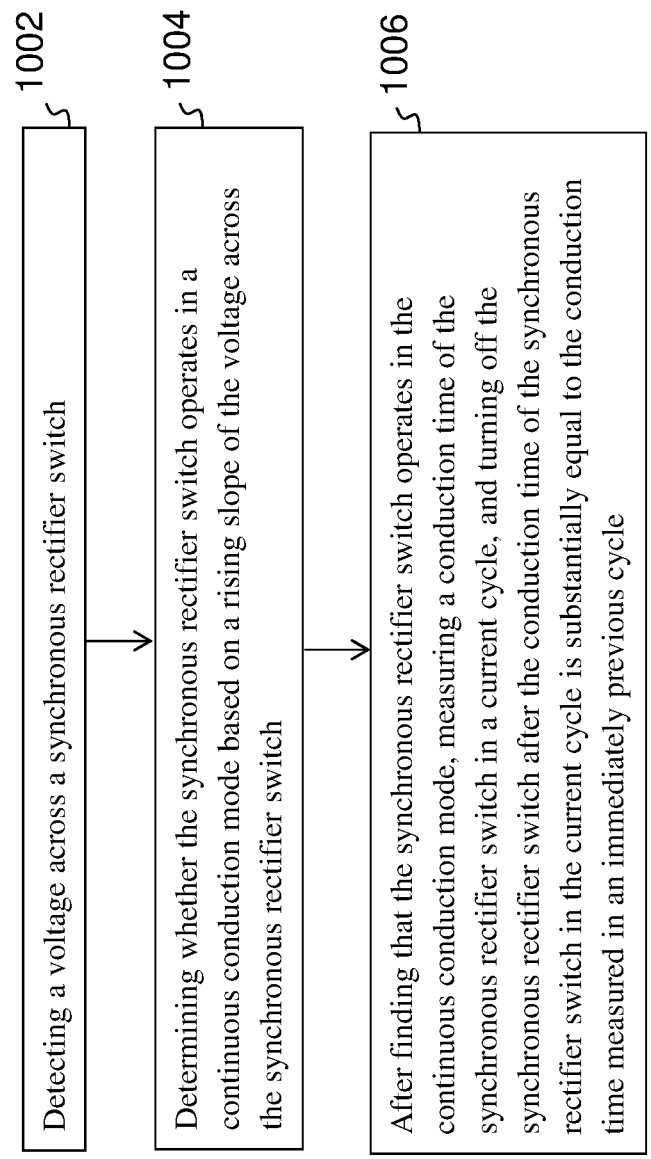
FIG. 10 illustrates a flow chart of a control method for the flyback converter shown in FIG. 1 in accordance with various embodiments of the present disclosure.

FIG. 10 illustrates a flow chart of a control method for the flyback converter shown in FIG. 1 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

A flyback converter comprises a secondary winding magnetically coupled to a primary winding, a synchronous rectifier switch having a first drain/source terminal connected to the secondary winding and a second drain/source terminal connected to a common voltage node. In some embodiments, the first drain/source terminal is coupled to a drain of the synchronous rectifier switch. The second drain/source terminal is coupled to a source of the synchronous rectifier switch. The common voltage node is coupled to ground. The flyback converter further comprises a controller configured to generate a gate drive signal applied to a gate of the synchronous rectifier switch. The controller comprises a continuous conduction mode detection circuit, a turn-off timer control circuit and a drive voltage control circuit.

The continuous conduction mode detection circuit (e.g., the continuous conduction mode detection circuit shown in FIG. 3) is configured to receive a voltage across the synchronous rectifier switch and determine whether the synchronous rectifier switch operates in a continuous conduction mode based on a rising slope of the voltage across the synchronous rectifier switch.

The turn-off timer control circuit (e.g., the turn-off timer control circuit shown in FIG. 5) is configured to measure a conduction time of the synchronous rectifier switch in a current cycle, and turn off the synchronous rectifier switch after the conduction time of the synchronous rectifier switch in the current cycle is substantially equal to the conduction time measured in an immediately previous cycle.

The drive voltage control circuit (e.g., the drive voltage control circuit shown in FIG. 7) is configured to reduce a gate drive voltage of the synchronous rectifier switch after the conduction time of the synchronous rectifier switch in the current cycle is substantially equal to the conduction time measured in an immediately previous cycle multiplied by a predetermined percentage.

At step 1002, the controller detects a voltage across a synchronous rectifier switch.

At step 1004, the controller determines whether the synchronous rectifier switch operates in a continuous conduction mode based on a rising slope of the voltage across the synchronous rectifier switch.

At step 1006, after finding that the synchronous rectifier switch operates in the continuous conduction mode, the controller measures a conduction time of the synchronous rectifier switch in the current cycle, and turns off the synchronous rectifier switch after the conduction time of the synchronous rectifier switch in the current cycle is substantially equal to the conduction time measured in the immediately previous cycle.

The control method further comprises after finding that the synchronous rectifier switch operates in the continuous conduction mode, reducing a gate drive voltage of the synchronous rectifier switch after the conduction time of the synchronous rectifier switch in the current cycle is substantially equal to the conduction time measured in the immediately previous cycle multiplied by the predetermined percentage.

The control method further comprises in a first switching cycle, converting a measured conduction time of the synchronous rectifier switch into a first voltage signal, and applying a sample-and-hold process to the first voltage signal to generate a second voltage signal for use in a second switch cycle, and in the second switching cycle, converting a measured conduction time of the synchronous rectifier switch into a third voltage signal, and comparing the third voltage signal with the second voltage signal to determine a time instant at which the synchronous rectifier switch is turned off.

The control method further comprises applying the sample-and-hold process to the first voltage signal to obtain an interim voltage signal, and applying a first predetermined scale factor to the interim voltage signal to obtain the second voltage signal.

The control method further comprises after applying the sample-and-hold process to the first voltage signal to obtain the interim voltage signal, applying a second predetermined scale factor to the interim voltage signal to obtain a gate drive voltage adjustment reference, and reducing a gate drive voltage of the synchronous rectifier switch after the conduction time of the synchronous rectifier switch in the current cycle is substantially equal to the gate drive voltage adjustment reference.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A synchronous rectifier control apparatus comprising:
a continuous conduction mode detection circuit configured to receive a voltage across a synchronous rectifier switch, and determine whether the synchronous rectifier switch operates in a continuous conduction mode based on a rising slope of the voltage across the synchronous rectifier switch;
a turn-off timer control circuit configured to measure a conduction time of the synchronous rectifier switch, and turn off the synchronous rectifier switch after the conduction time of the synchronous rectifier switch in a current cycle is substantially equal to the conduction time measured in an immediately previous cycle; and
a drive voltage control circuit configured to reduce a gate drive voltage of the synchronous rectifier switch after the conduction time of the synchronous rectifier switch in the current cycle is substantially equal to the conduction time measured in the immediately previous cycle multiplied by a predetermined percentage.

2. The synchronous rectifier control apparatus of claim 1, wherein:
the continuous conduction mode detection circuit is configured to detect the rising slope of the voltage across the synchronous rectifier switch on a cycle-by-cycle basis, and generate a signal to enable the turn-off timer control circuit and the drive voltage control circuit upon detecting the continuous conduction mode.

3. The synchronous rectifier control apparatus of claim 2, wherein:
the continuous conduction mode detection circuit comprises a capacitor, a resistor, a first comparator, a second comparator and a latch circuit, and wherein:
the capacitor and the resistor are connected in series between a drain/source terminal of the synchronous rectifier switch and ground;
a non-inverting input of the first comparator is connected to the drain/source terminal of the synchronous rectifier switch;
an inverting input of the first comparator is connected to ground;
an output of the first comparator is connected to an input terminal of the latch circuit;
a non-inverting input of the second comparator is connected to a common node of the capacitor and the resistor;
an inverting input of the second comparator is connected to a predetermined continuous conduction mode reference voltage;
an output of the second comparator is connected to a clock input terminal of the latch circuit; and
an output terminal of the latch circuit is configured to generate the signal to enable the turn-off timer control circuit and the drive voltage control circuit.

4. The synchronous rectifier control apparatus of claim 1, wherein:
the turn-off timer control circuit comprises a conduction time measurement circuit, a first calculation circuit and a first voltage comparator, and wherein the conduction time measurement circuit is configured to:
convert the conduction time of the synchronous rectifier switch into a first voltage signal representing the conduction time in the current cycle; and
sample and hold the first voltage signal to generate a second voltage signal for use in a next cycle.

5. The synchronous rectifier control apparatus of claim 4, wherein:
a first output of the conduction time measurement circuit is connected to a non-inverting input of the first voltage comparator, and wherein through the first output, the first voltage signal is applied to the non-inverting input of the first voltage comparator; and
a second output of the conduction time measurement circuit is connected to an inverting input of the first voltage comparator through the first calculation circuit, and wherein through the second output, the second voltage signal is applied to the inverting input of the first voltage comparator, and wherein an output signal of the first voltage comparator is configured to turn off the synchronous rectifier switch after the conduction time of the synchronous rectifier switch in the current cycle is substantially equal to the conduction time measured in the immediately previous cycle.

6. The synchronous rectifier control apparatus of claim 4, wherein:
the first calculation circuit is a first gain stage having a first predetermined scale factor; and
the conduction time measurement circuit comprises a comparator, a switch, a current source, a capacitor and a sample-and-hold circuit, and wherein:
a non-inverting input of the comparator is connected to a drain/source terminal of the synchronous rectifier switch;
an inverting input of the comparator is connected to ground;
an output of the comparator is connected to a gate of the switch;
the current source and the capacitor are connected in series between a bias voltage and ground, and wherein the capacitor and switch are connected in parallel; and
the sample-and-hold circuit is connected to a common node of the current source and the capacitor.

7. The synchronous rectifier control apparatus of claim 1, wherein:
the drive voltage control circuit comprises a conduction time measurement circuit, a second calculation circuit and a second voltage comparator, and wherein the conduction time measurement circuit is configured to:
convert the conduction time of the synchronous rectifier switch into a first voltage signal representing the conduction time in the current cycle; and
sample and hold the first voltage signal to generate a second voltage signal for use in a next cycle.

8. The synchronous rectifier control apparatus of claim 7, wherein:
a first output of the conduction time measurement circuit is connected to a non-inverting input of the second voltage comparator; and
a second output of the conduction time measurement circuit is connected to an inverting input of the second voltage comparator through the second calculation circuit, and wherein through the second output, the second voltage signal is applied to the inverting input of the second voltage comparator, and wherein an output signal of the second voltage comparator is configured to reduce the gate drive voltage of the synchronous rectifier switch after the conduction time of the synchronous rectifier switch in the current cycle is substantially equal to the conduction time measured in the immediately previous cycle multiplied by the predetermined percentage.

9. The synchronous rectifier control apparatus of claim 7, wherein:
the second calculation circuit is a second gain stage having a second predetermined scale factor.

10. The synchronous rectifier control apparatus of claim 1, wherein:
the synchronous rectifier switch is in a secondary side of a flyback isolated power converter.

11. A method comprising:
detecting a voltage across a synchronous rectifier switch;
determining whether the synchronous rectifier switch operates in a continuous conduction mode based on a rising slope of the voltage across the synchronous rectifier switch; and
after finding that the synchronous rectifier switch operates in the continuous conduction mode, measuring a conduction time of the synchronous rectifier switch in a current cycle, and turning off the synchronous rectifier switch after the conduction time of the synchronous rectifier switch in the current cycle is substantially equal to the conduction time measured in an immediately previous cycle.

12. The method of claim 11, further comprising:
after finding that the synchronous rectifier switch operates in the continuous conduction mode, reducing a gate drive voltage of the synchronous rectifier switch after the conduction time of the synchronous rectifier switch in the current cycle is substantially equal to the conduction time measured in the immediately previous cycle multiplied by a predetermined percentage.

13. The method of claim 11, further comprising:
applying the voltage across the synchronous rectifier switch to a capacitor-resistor network comprising a capacitor and a resistor connected in series; and
comparing a voltage on a common node of the resistor and the capacitor with a predetermined continuous conduction mode reference to determine whether the synchronous rectifier switch operates in the continuous conduction mode.

14. The method of claim 11, further comprising:
in a first switching cycle, converting a measured conduction time of the synchronous rectifier switch into a first voltage signal, and applying a sample-and-hold process to the first voltage signal to generate a second voltage signal for use in a second switch cycle; and
in the second switching cycle, converting a measured conduction time of the synchronous rectifier switch into a third voltage signal, and comparing the third voltage signal with the second voltage signal to determine a time instant at which the synchronous rectifier switch is turned off.

15. The method of claim 14, further comprising:
applying the sample-and-hold process to the first voltage signal to obtain an interim voltage signal; and
applying a first predetermined scale factor to the interim voltage signal to obtain the second voltage signal.

16. The method of claim 15, further comprising:
after applying the sample-and-hold process to the first voltage signal to obtain the interim voltage signal, applying a second predetermined scale factor to the interim voltage signal to obtain a gate drive voltage adjustment reference; and
reducing a gate drive voltage of the synchronous rectifier switch after the conduction time of the synchronous rectifier switch in the current cycle is substantially equal to the gate drive voltage adjustment reference.

17. The method of claim 11, further comprising:
in a first switching cycle, using a counter to measure a conduction time of the synchronous rectifier switch;
saving the conduction time of the synchronous rectifier switch in the first switching cycle into a latch; and
in a second switching cycle, using the counter to measure the conduction time of the synchronous rectifier switch in the second switching cycle, and comparing the conduction time in the second switching cycle with the conduction time in the first switching cycle to determine a time instant at which the synchronous rectifier switch is turned off.

18. A system comprising:
a secondary winding magnetically coupled to a primary winding;
a synchronous rectifier switch having a first drain/source terminal connected to the secondary winding and a second drain/source terminal connected to a common voltage node;
a controller configured to generate a gate drive signal applied to a gate of the synchronous rectifier switch, wherein the controller comprises:
a continuous conduction mode detection circuit configured to receive a voltage across the synchronous rectifier switch and determine whether the synchronous rectifier switch operates in a continuous conduction mode based on a rising slope of the voltage across the synchronous rectifier switch; and
a turn-off timer control circuit configured to measure a conduction time of the synchronous rectifier switch in a current cycle, and turn off the synchronous rectifier switch after the conduction time of the synchronous rectifier switch in the current cycle is substantially equal to the conduction time measured in an immediately previous cycle.

19. The system of claim 18, wherein the controller further comprises:
a drive voltage control circuit configured to reduce a gate drive voltage of the synchronous rectifier switch after the conduction time of the synchronous rectifier switch in the current cycle is substantially equal to the conduction time measured in the immediately previous cycle multiplied by a predetermined percentage.

20. The system of claim 18, further comprising:
a primary switch connected in series with the primary winding, wherein the primary switch, the primary winding, the secondary winding and the synchronous rectifier switch form a flyback converter.

* * * * *